United States Patent [19]

Nakanishi et al.

[11] Patent Number: 4,955,790

[45] Date of Patent: Sep. 11, 1990

[54] CURRENT LIMITING CIRCUIT FOR FUEL PUMP MOTOR

[75] Inventors: Shingo Nakanishi, Obu; Susumu Yamamoto, Kawasaki, both of Japan

[73] Assignees: Aisan Kogyo Kabushiki Kaisha, Obu; Fuji Electric Co., Ltd., Kawasaki, both of Japan

[21] Appl. No.: 284,408

[22] Filed: Dec. 14, 1988

[30] Foreign Application Priority Data

Dec. 28, 1987 [JP] Japan ................................ 62-200368

[51] Int. Cl.⁵ ........................ F04B 17/00; F04B 35/04
[52] U.S. Cl. .................................. 417/45; 417/423.1;
 310/68 C
[58] Field of Search .............................. 417/45, 423.1;
 310/68 C

[56] References Cited

U.S. PATENT DOCUMENTS

| 4,403,177 | 9/1983 | Weber et al. | 318/696 |
| 4,472,666 | 9/1984 | Akeda et al. | 318/439 |
| 4,726,746 | 2/1988 | Takada et al. | 417/423.1 |

FOREIGN PATENT DOCUMENTS 56-88982 7/1981 Japan .
61-14496 1/1986 Japan .

Primary Examiner—Leonard E. Smith
Assistant Examiner—David W. Scheuermann
Attorney, Agent, or Firm—Dennison, Meserole, Pollack & Scheiner

[57] ABSTRACT

A motor-driven fuel pump comprising a pumping unit, a brushless electric motor for driving the pumping unit, a control circuit for controlling power supply to the brushless motor and a pump casing for encasing the pumping unit, the brushless motor and the control circuit. The control circuit comprises a current limiting circuit which inhibits flow to the brushless motor of a current above an amperage which is higher than an amperage of a normal operating current and lower than an amperage of a current which would flow at starting of the brushless motor without the current limiting circuit.

5 Claims, 5 Drawing Sheets

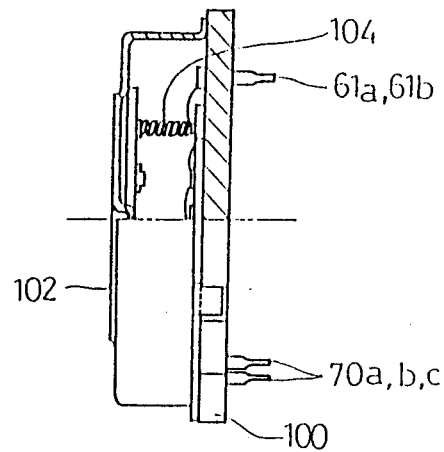
FIG. 8
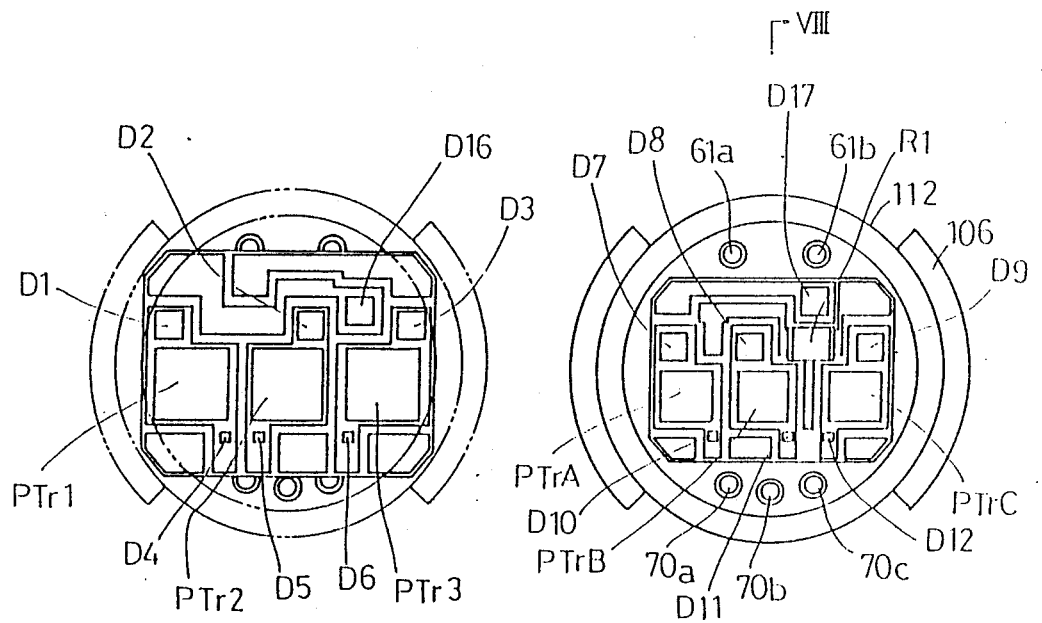
FIG. 9
(PRIOR ART)
FIG. 10

CURRENT LIMITING CIRCUIT FOR FUEL PUMP MOTOR

BACKGROUND OF THE INVENTION

The present invention relates to a motor-driven fuel pump, and more particularly to a compact motor-driven fuel pump producing a large output for use in a fuel supply system for an automobile.

There has been provided a motor-driven fuel pump of a type in which a pumping unit, a brushless electric motor for driving the pumping unit and a control circuit for controlling power supply to the brushless electric motor are encased within an integral pump casing, as described in, for example, Japanese Patent Laid-Open Publication Nos. 56-88982 and 61-14496.

In such a prior art motor-driven fuel pump, the control circuit only includes a circuit for sequentially switching stator coils through which current flows in accordance with the angular position of a rotor of the brushless motor. This causes current flow as shown in FIG. 4 on starting of the motor-driven fuel pump. Specifically, immediately after starting of the pump, current begins to flow through the stator coil, the current progressively increasing, for example, as shown by a waveform A as a parameter of inductance component, resistance component and the like of the stator coil. Then, as the torque generated by the motor comes near the load torque, the current becomes stable, until it reaches an amperage determined by the output characteristic of the motor and the load torque, and is maintained to flow at the amperage thereafter. Immediately after starting, because of low rotating speed of the rotor, the current flowing through the stator coil increases to a saturation amperage (the saturation amperage in FIG. 4 is 30 to 35 amperes), and thereafter the current is maintained at the saturation amperage. As the rotating speed of the rotor is gradually increased until it reaches a normal operating speed, the current flowing through the stator coil becomes drastically smaller than the saturation current, for example, to an amperage of about 10 amperes, as shown by waveforms in the region B.

Therefore, the prior art motor-driven fuel pump must employ elements for switching the stator coil current, such as, power transistors which can switch a large current (of 30 to 35 amperes in the above description) flowing immediately after starting.

In a cold district, jumper start means may be employed at starting of an engine. This means is adapted to apply voltage twice the normal operating power voltage (for example, by connecting two batteries in series), at the starting of the engine. Such jumper start means causes a current greatly larger than the normal operating current to flow at the starting of the motor-driven fuel pump.

Thus, the prior art motor-driven fuel pump is at a disadvantage because requires elements for switching a large current which is quite a high amperage in comparison with the normal operating current of about 10 amperes and flows only immediately after starting.

SUMMARY OF THE INVENTION

It is an object of the present invention to provide a structure which permits use of switching elements having a minimum capacity for the stator current.

The above object is achieved by a motor-driven fuel pump including a pumping unit, a brushless electric motor for driving the pumping unit, a control circuit for controlling power supply to the brushless motor and a pump casing for encasing the pumping unit, the brushless motor and the control circuit. The control circuit comprises a current limiting circuit which inhibits flow to the brushless motor of a current above an amperage which is higher than the amperage of the normal operating current and lower than the amperage of the current which would flow at the starting of the brushless motor without the current limiting circuit.

Provision of the current limiting circuit causes the stator coil current to flow as shown in FIG. 5 to be supplied to the brushless motor. The axes of ordinate and abscissa in FIG. 5 are shown on the same scale as those in FIG. 4.

In FIG. 5, current begins to flow to the stator coil immediately after the starting of the motor-driven fuel pump, the current progressively increasing as a parameter of inductance component, resistance component and the like of the stator coil quite in the same manner as the current flow in FIG. 4. With no current limiting circuit, the stator coil current would further increase, but in this case, the current limiting circuit inhibits increase of the current above the amperage (for example, 15 to 20 amperes in FIG. 5) lower than the amperage (for example, 30 to 35 amperes) of the current which would flow immediately after starting without such a current limiting circuit. As the result, the current flow as shown by a waveform C in FIG. 5 is available. Thereafter, when the brush motor reaches the normal operating condition, the stator coil current flows as shown in the region D in FIG. 5 exactly in the same manner as that in the region B in FIG. 4. As the limit amperage of the current by the current limiting circuit is above the amperage of the normal operating current, the current limiting circuit is not activated during the normal operation, causing no defective influence on the pump characteristics.

As described above, according to the present invention, limiting of current flowing through switching elements, for switching the exciting current of the stator coils, allows use of switching elements having a minimum required current carrying capacity, and permits compact design of the whole control circuit. Furthermore, the fuel pump having substantially the same characteristics as the wide-spread conventional fuel pump with brushes can be formed in the same diameter as the conventional fuel pump, using a brushless motor, which facilitates replacement of the fuel pump in comparison with the conventional fuel pump. Because the whole control circuit can be located within the integral pump casing, the external connecting terminals and wires can be reduced in number.

Thus, provision of the current limiting circuit in accordance with the present invention permits realization of a smaller-diameter fuel pump using a brushless motor, resulting in reduction of cost.

The present invention will become more fully apparent from the claim and the description as it proceeds in connection with the drawings.

BRIEF DESCRIPTION OF THE DRAWINGS

FIG. 8 is a view partially in vertical section of a control circuit unit;

FIG. 9 is a view illustrating installation of the control circuit including no current limiting circuit; and FIG. 10 is a view illustrating installation of the control circuit including the current limiting circuit.

DETAILED DESCRIPTION OF THE PREFERRED EMBODIMENT

Figure 6:
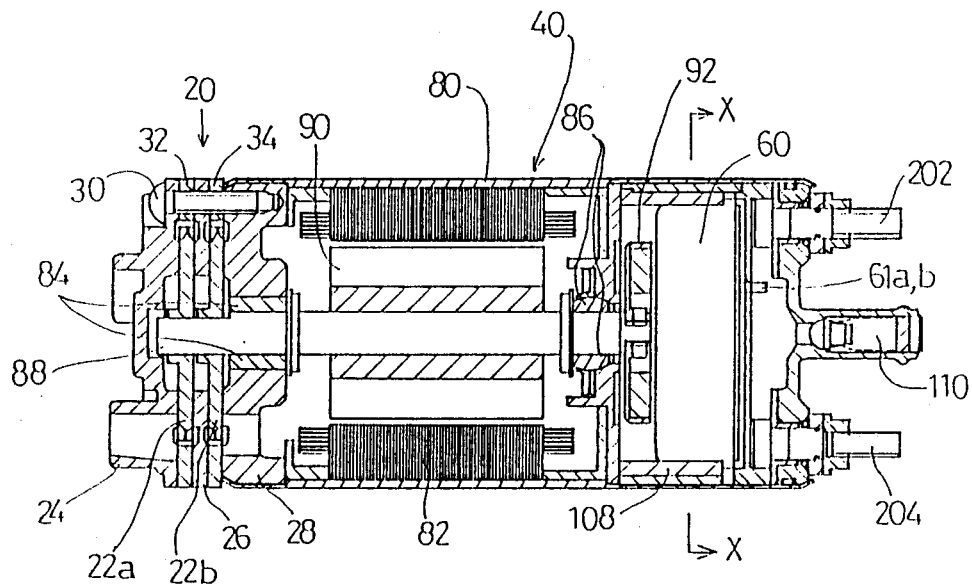
FIG. 6 is a vertical sectional view of a fuel pump of an embodiment according to the present invention.

FIG. 6 is a vertical sectional view of a compact (50 mm in diameter in concrete) large output motor-driven fuel pump. The fuel pump includes a pumping unit 20, a brushless electric motor 40 and a control circuit 60 located in series from the left (when viewing FIG. 6) within a pump casing 80 in union. A stator 82 is disposed circumferentially on the inner peripheral surface of the casing 80 in the central portion thereof, and is fixed to the casing 80 along the axial direction thereof.

There are provided on both sides of the stator 82 a pair of bearings 84 and 86 fixed to the casing coaxially therewith. A shaft 88 is supported by the bearings 84 and 86 rotatably but restricted from axial movement. A rotor magnet 90 made of a permanent magnet is firmly mounted on the shaft 88. The above members constitute the brushless motor 40.

The pumping unit 20 includes a plate 24, a ring plate 32, a plate 26, a ring plate 34 and a plate 28 located in layers from the left (when viewing FIG. 6) and fastened in union by a screw 30 to form an overall pump housing which is caulked in the casing 80 to constitute the integral fuel pump.

The ring plates 32 and 34 define a space in which impellers 22a and 22b are positioned. The impellers 22a and 22b are rotated by the shaft 88.

The plates 24, 26 and 28 have openings which cooperate with a number of tooth grooves defined in the peripheral edges of the impellers 22a and 22b to form, as a whole, a cascade pump.

Figure 1:
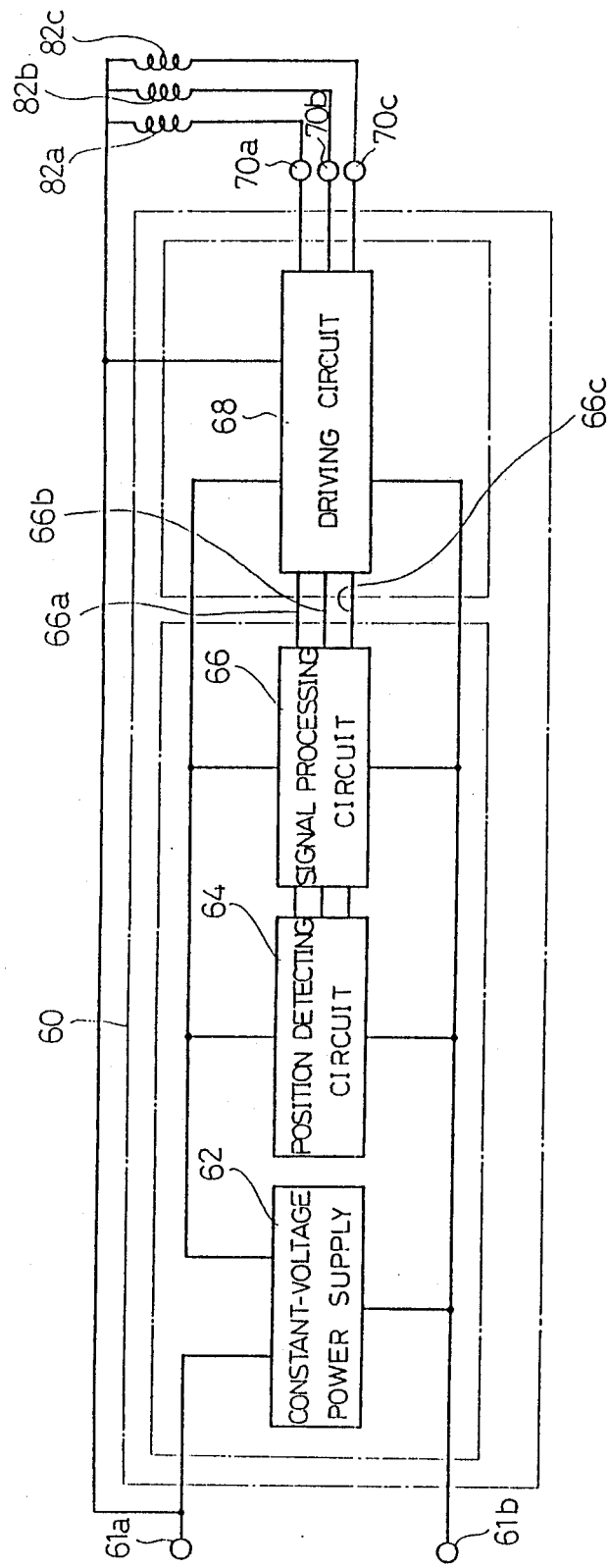
FIG. 1 is a general schematic view of a control circuit.

A sensor magnet 92 is secured to the end of the shaft 88 adjacent the bearing 86 to rotate with the rotor magnet 90 in union. A control circuit 60 is disposed in opposing relationship to the sensor magnet 92. The system diagram of the control circuit 60 is shown in FIG. 1.

The control circuit is provided with two terminals 61a and 61b to be connected with an external power source. The external power terminals 61a and 61b are connected with a constant-voltage power source 62 for applying a constant source voltage to circuits which will be mentioned later. The voltage regulated to a constant value by the constant voltage power source 62 is applied to a position detecting circuit 64. The position detecting circuit 64 comprises, for example, Hall devices for converting magnetism into electric signals. The Hall devices are disposed in the control circuit 60 in opposing relationship to the sensor magnet 92 in FIG. 6. In this embodiment, the position detecting circuit 64 comprises three Hall devices circumferentially located at equal intervals so as to detect the angular position of the rotor magnet 90. Output from the position detecting circuit 64 is supplied to a signal processing circuit 66 which determines, in accordance with the output of the position detecting circuit 64, which stator coil is to be supplied with the exciting current and, according to the determination, transmits an output to a selected one of three signal conductors 66a, 66b and 66c. In response to the signal from the selected one of the three signal conductors 66a, 66b and 66c, a driving circuit 68 supplies exciting current to a corresponding one of three stator coils 82a, 82b and 82c, and the details are illustrated in FIGS. 2 and 3.

Figure 2:
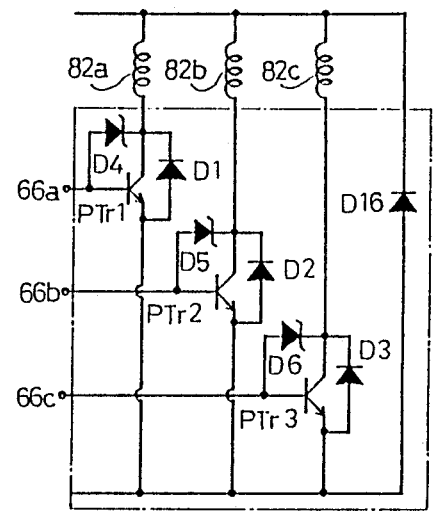
FIG. 2 is a circuit diagram of a driving circuit including no current limiting circuit.

FIG. 2 shows a prior art driving circuit 68 including no current limiting circuit. When current flows through the signal conductor 66a, a power transistor PTr1 is activated, so that exciting current flows through the stator coil 82a. In the same way, flow of current through the signal conductor 66b results in flow of exciting current through the stator coil 82b, and flow of current through the signal conductor 66c results in flow of exciting current through the stator coil 82c.

Figure 3:
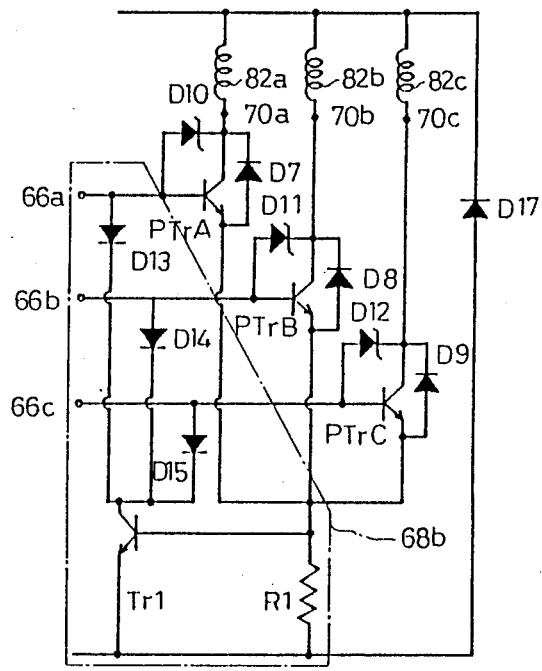
FIG. 3 is a circuit diagram of the driving circuit including a current limiting circuit.

FIG. 3 shows the driving circuit in FIG. 2 but including a current limiting circuit 68b. As the switching function for the stator coils 82a, 82b and 82c in this driving circuit is exactly the same as that in the driving circuit in FIG. 2, explanation thereof will be omitted.

Figure 4:
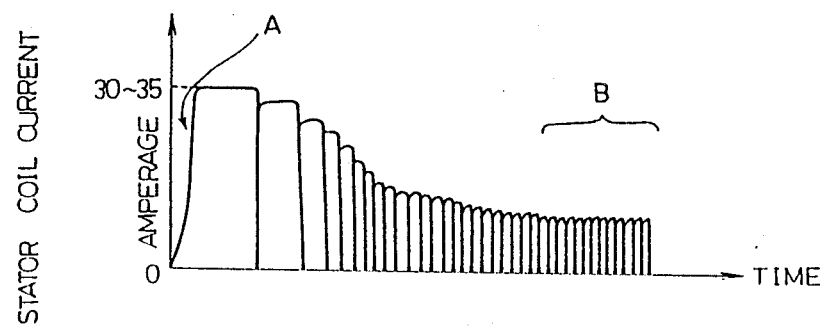
FIG. 4 is a view illustrating the stator coil current flow when no current limiting circuit is incorporated.
Figure 5:
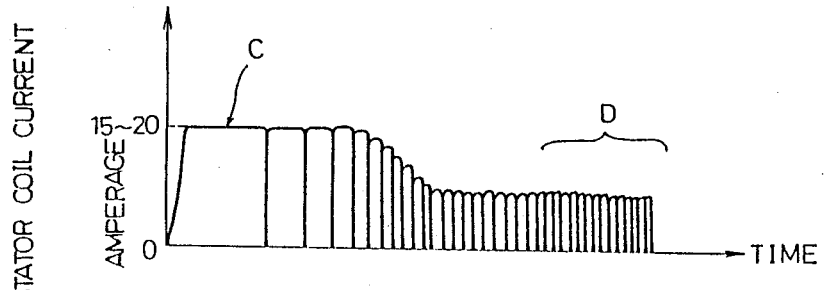
FIG. 5 is a view illustrating the stator coil current flow when the current limiting circuit is incorporated.

Now, the explanation will be related to the current limiting circuit 68b shown in the left lower portion when viewing FIG. 3. A small resistor R1 is connected in the circuit, so that exciting current flowing through any one of the stator coils 82a, 82b and 82c may pass the resistor R1. When current begins to flow through any one of the stator coils as shown in FIG. 4 or 5, the potential difference between both ends of the resistor R1 grows with increase in the stator coil current. When the potential difference between both ends of the resistor R1 exceeds a threshold voltage of the limiting transistor Tr1, base current to be supplied from one of the signal conductors 66a, 66b and 66c to a corresponding power transistor PTrA, PTrB or PTrC is bypassed through one of diodes D13, D14 and D15. As a result, the collector-emitter voltage of the power transistor increases, causing the potential difference developed at the stator coil 82a, 82b or 82c to be reduced and consequently the stator coil current to be limited. The limiting value of the stator coil current is determined in accordance with resistance of the resistor R1 and the threshold voltage of the limiting transistor Tr1, and in FIG. 5, it is set to 15 to 20 amperes.

As will be understood from the above description, the power transistors PTr1, PTr2 and PTr3 in the circuit in FIG. 2 must have a sufficient capacity to switch a large stator coil current as shown in FIG. 4. In comparison therewith, the switching elements PTrA, PTrB and PTrC in FIG. 3 are only required to have such a capacity as to switch the limited current as shown in FIG. 5.

FIG. 10 is a view illustrating installation of the control circuit 60 having a current limiting circuit and corresponds to a sectional view taken along lines X—X in FIG. 6, while FIG. 9 is a view illustrating installation of the driving circuit in FIG. 2. As is apparent from the drawings, the power transistors PTrA, PTrB and PTrC with a small capacity are compact in size in comparison with the power transistors PTr1, PTr2 and PTr3, and consequently, the control circuit in FIG. 10 occupies a smaller space in comparison with the control circuit in FIG. 9. The circuit in FIG. 10 includes additional elements of the current limiting circuit 68b which are not involved in the circuit in FIG. 9, such as the resistor R1. However, the total space required for installing the control circuit having a current limiting circuit is smaller than that for installing the circuit having no current limiting circuit.

FIG. 8 is a sectional view taken along lines VIII—VIII in FIG. 10, illustrating the whole control circuit 60 enclosed in oil tight manner in a space defined by a substrate 100 and a cap 102. Some elements constituting the current limiting circuit 68b including the limiting transistor Tr1, diodes D13, D14, D15 or others are arranged in the interior of the cap 102. The circuit in the interior of the cap 102 and the circuit on the substrate 100 are connected through an internal conductor 104. Such an arrangement of the element constituting the circuit on the two surfaces facilitates compact construction of the circuit. The substrate 100 carrying the control circuit 60 is provided with a flange 106 extending along a part of the circumferential edge thereof to be secured to a spacer 108 in FIG. 6. The portion 102 of the circumferential edge free from the flange 106 and the spacer 108 defines a space serving as a passage of fuel. As shown in FIG. 6, connectors 202 and 204 are provided to be connected with the power source and connected with the terminals 61a and 61b. In this embodiment, the control circuit unit is provided with the flange 106 (46 mm in diameter) and the cap 102 (34 mm in inner diameter) and can be incorporated in the pump having a bore diameter of 50 mm as shown in FIG. 6. In comparison therewith, in the circuit of FIG. 9, the cap cannot be designed so small as to be 34 mm in inner diameter, causing the bore diameter of the pump to be increased.

Partition walls in FIG. 6 are formed with holes (not shown) through which fuel flows, thus completing a pump into which fuel is sucked through an inlet port formed in the plate 24 and from which fuel is discharged through a discharge port 110.

Figure 7:
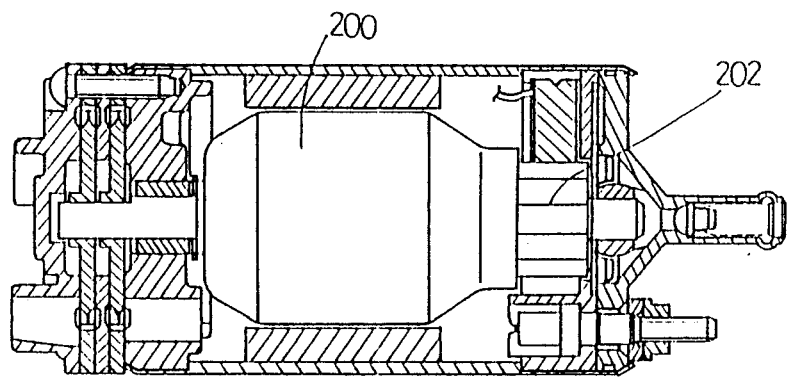
FIG. 7 is a vertical sectional view of a fuel pump using a motor with brushes.

FIG. 7 shows a motor-driven fuel pump having substantially the same function as the motor-driven fuel pump of the above embodiment but employing a commutator motor. FIGS. 6 and 7 are drawn on an equal scale, and it will be understood that the brushless motor type fuel pump as shown in FIG. 6 is almost the same in size as the fuel pump employing a motor with brushes, while the brushless motor without current limiting circuit requires a substrate larger than that in FIG. 10, as shown in FIG. 9, so that is impossible to construct the fuel pump employing such a brushless motor in the same diameter as that of the fuel pump employing a conventional motor with brushes.

While the invention has been described with reference to a preferred embodiment thereof, it is to be understood that modifications or variations may be easily made without departing from the scope of the present invention which is defined by the appended claims.

What is claimed is:

1. A motor-driven fuel pump comprising a pumping unit, a brushless electric motor having a plurality of stator coils, and a control circuit for controlling power supplied to said brushless motor for driving said pumping unit, said power being a starting amperage for initially starting said pumping unit and a running amperage for operating said pumping unit with said starting amperage being significantly higher than said running amperage; wherein the improvement comprising:
   a current adjusting circuit forming part of said control circuit and including:
   a plurality of power transistors with a base, each said power transistor connected in series to one of said plurality of stator coils;
   a resistor connected in series to said each stator coil;
   a threshold transistor having a base connected to said resistor, an emitter and a collector; and
   a plurality of signal conductors, each connected to said collector of said threshold transistor and each respectively connected to said corresponding base of each said power transistor;
   said current adjusting circuit initially receiving said power and determining said starting amperage which has a tendency to exceed a predetermined amperage, said predetermined amperage being slightly higher than said running amperage and defined by said resistor and said threshold transistor, said current adjusting circuit resisting said starting amperage from exceeding said predetermined amperage by causing a voltage between the base and emitter of said threshold transistor to increase and a resistance between the collector and the emitter of said threshold transistor to decrease causing a resistance at said power transistors to increase and said starting amperage decreasing to said predetermined amperage.

2. The motor driven fuel pump as defined in claim 1, wherein each said power transistor connected in series to one of said plurality of stator coils providing a value of resistance which increases while said current to said stator coils is higher than said predetermined amperage and decreases while said current to said stator coil is lower than said predetermined amperage.

3. The motor-driven fuel pump as defined in claim 2, wherein said resistor of said current adjusting circuit is connected in series with said each stator coil, said base of said threshold transistor connected to one end of said resistor, and said emitter is connected to the other end of said resistor; said plurality of signal conductors connected to said collector of said threshold transistor and each respectively connected to said corresponding base of each said power transistor, whereby said power is controlled to maintain said predetermined amperage in such a manner that when said starting current at said stator coil becomes higher than said predetermined amperage, said voltage between the base and the emitter of said threshold transistor increases, and said value of resistance between the collector and the mitter of said threshold transistor decreases, and an amperage of a signal bypassed to said threshold transistor increases, and the value of resistance of said power transistor increases, and said power to said stator coils decreases to said predetermined amperage.

4. The motor-driven fuel pump as defined in claim 2, wherein said control circuit is located in a space defined between a substrate and a cap.

5. The motor-driven fuel pump as defined in claim 4, wherein all elements of said control circuit are mounted both on a surface of said substrate and on an inner surface of said cap.

* * * * *